(12) United States Patent
Huber (10) Patent No.: US 6,253,635 B1
(45) Date of Patent: Jul. 3, 2001

(54) BRAKE PEDAL CONFIGURATION

(75) Inventor: Michael Huber, Eilsbrunn (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/158,433

(22) Filed: Sep. 21, 1998

(30) Foreign Application Priority Data

Sep. 19, 1997 (DE) .............................................. 197 41 366

(51) Int. Cl.⁷ ...................................................... G05G 1/14
(52) U.S. Cl. .............................. 74/512; 74/526; 267/44; 267/158
(58) Field of Search ................................ 267/44, 45, 46, 267/158, 160, 164; 74/512, 526

(56) References Cited

U.S. PATENT DOCUMENTS

| | | | | |
|---|---|---|---|---|
| 3,602,205 | * | 8/1971 | Turkish | 123/90.65 |
| 4,130,027 | * | 12/1978 | Leighton | 74/512 |
| 4,695,819 | * | 9/1987 | Bowsher | 338/153 |
| 4,888,997 | * | 12/1989 | Eckert et al. | 73/862.65 |
| 4,958,607 | * | 9/1990 | Lundberg | 123/399 |
| 5,301,931 | * | 4/1994 | Bigo | 267/5 |
| 5,309,361 | * | 5/1994 | Drott et al. | 364/424.1 |
| 5,505,521 | * | 4/1996 | Meiller et al. | 297/302.1 |
| 5,934,152 | * | 8/1999 | Aschoff et al. | 74/513 |

FOREIGN PATENT DOCUMENTS

| | | |
|---|---|---|
| 42 01 444 A1 | 8/1992 | (DE) . |
| 19540705A1 | 5/1997 | (DE) . |
| 19615186C1 | 8/1997 | (DE) . |
| 0 500 888 B1 | 1/1996 | (EP) . |
| 0708006A1 | 4/1996 | (EP) . |

* cited by examiner

Primary Examiner—Robert J. Oberleitner
Assistant Examiner—Bradley King
(74) Attorney, Agent, or Firm—Herbert L. Lerner; Laurence A. Greenberg; Werner H. Stemer (57) ABSTRACT

The brake pedal configuration is particularly suited for an automobile having electrically actuated wheel brakes. A spring provides a resistance force with a nonlinear characteristic against brake actuation forces exerted on the brake pedal. The spring is arcuately curved and is fastened at one end to a support. At is second end the spring is connected to the brake pedal in an articulated manner. At its middle region, the spring is located opposite a stop on which the spring comes to bear after a partial deflection.

8 Claims, 6 Drawing Sheets

BRAKE PEDAL CONFIGURATION

BACKGROUND OF THE INVENTION

Field of the Invention

The invention lies in the automotive field. More specifically, the invention relates to a brake pedal configuration, in particular to such a configuration for an automobile equipped with electrically actuated wheel brakes. The system detects actuations of a brake pedal by means of sensors and it is provided with a spring configuration that opposes the brake actuation forces exerted on the brake pedal with a resistance force and that has a nonlinear spring characteristic.

In conventional automobile brake systems, the braking force is generated by the driver via the brake pedal. The force is usually boosted and transmitted via hydraulic delivery lines to the wheel brake cylinders. In power brake systems, there is no mechanical, pneumatic or hydraulic connection between the actuating unit, that is to say the brake pedal, and the wheel brakes. Although the driver, by actuating the brake pedal, can influence the braking force by means of suitable control devices, his physical strength is not utilized either fully or partially for generating the braking force when the brake pedal is actuated. If the power brake system is controlled electronically and the wheel brakes are actuated by means of electric energy, then it is necessary, in order to detect the driver's deceleration request, to have a special brake pedal configuration which detects actuations of the brake pedal by means of sensors and generates electric signals which are transmitted in electronic form to a brake control unit (see German patent DE 196 15 186 C1; and ATZ 98, 1996, No. 6, pages 328–32).

In conventional hydraulic brake systems, the pedal characteristic can be modified only within very narrow limits. This is so because, due to the hydraulic coupling between the actuating unit and the wheel brakes, this characteristic depends on the design of the brake system, that is to say the size of the wheel brake cylinders and the design of the brake booster and hydraulic fluid volume.

The force/travel characteristic of a known brake pedal for activating an electric brake system is generated by means of a cup spring assembly which is connected to the brake pedal via a rod that is articulated at the pedal (German published patent application DE 195 40 705 A1). There, the cup spring assembly is composed of cup springs having different characteristics.

In another published brake pedal configuration for electric brake systems (European EP 0 708 006 A1), the reactive force to the actuation of the brake pedal is generated by two helical springs which have different spring characteristics and which surround a piston rod that is articulated at the brake pedal.

SUMMARY OF THE INVENTION

It is accordingly an object of the invention to provide a brake pedal configuration, which overcomes the above-mentioned disadvantages of the heretofore-known devices and methods of this general type and which provides, at little outlay, a brake pedal configuration which makes it possible to actuate the brakes in an ergonomically favorable way. Moreover, its pedal characteristic is to be capable of being adapted to the respective automobile type and intended use. Thus, for example in the case of a sports vehicle, it is to be possible to set a somewhat harder pedal characteristic, requiring a higher actuating force for the same pedal travel, than, for example, in the case of a limousine brake system where the emphasis is on comfort.

With the foregoing and other objects in view there is provided, in accordance with the invention, a brake pedal configuration, particularly a brake pedal configuration that is suitable for automobiles with electrically actuated wheel brakes, comprising:

a brake pedal;

a spring configuration disposed so as to provide a resistance force opposing a brake actuation force exerted on the brake pedal;

the spring configuration having a nonlinear spring characteristic and including an arcuately curved spring with a first end fastened at a support, a second end articulated at the brake pedal, and a middle region; and a stop disposed opposite the middle region of the spring such that the spring comes to bear against the stop after a partial deflection thereof.

The brake pedal configuration is provided with a spring that opposes the brake actuation forces exerted on the brake pedal and that has a nonlinear spring characteristic, in particular a progressive spring characteristic. An advantage of this is that, during braking with low decelerations, that is to say during normal braking, the brake pedal, which is initially relatively soft over a sufficiently long pedal travel, makes it possible to meter the braking effect with high sensitivity. By contrast, during emergency braking, the brake pedal is depressed quickly and operated with great foot force. In order to keep the reaction time short, it is useful for the pedal travel to be as short as possible. The soft zone with low pedal force is traversed rapidly and, thereafter, the pedal force rises sharply over a very short pedal travel.

Advantageously, the brake pedal configuration is designed in such a way that the maximum pedal force which is to be applied by a normal driver occurs when the pedal travel is the most ergonomically favorable. Since there is no mechanical connection between the brake pedal and the electrically actuated brakes, the pedal sensation can be determined freely, irrespective of the design of the brake system and the vehicle type.

In accordance with an added feature of the invention, the spring is a leaf spring.

In accordance with an additional feature of the invention, the stop and the spring define a wedge-shaped annular gap therebetween. The gap widens in a direction from the first end toward the second end.

Alternatively, the stop is a bolt with a round cross section.

In accordance with another feature of the invention, the spring is a torsion spring disposed coaxially about a pivot axis of the brake pedal, and including a supporting rod articulated at the brake pedal and a helical spring articulated at a stationary point relative to the brake pedal and mounted relative to the supporting rod such that, when the brake pedal is actuated, the helical spring is compressed after an initial idle travel of the brake pedal has been overcome. In accordance with a further feature of the invention, the helical spring bears upon an elastic stop.

In accordance with again a further feature of the invention, a pushrod is attached to the brake pedal, the pushrod having a spherical head, and an elastic molding disposed such that, when the brake pedal is actuated, the elastic molding is compressed by the spherical head after an idle travel has been overcome.

In accordance with another feature of the invention, several sensors are disposed and connected so as to sense actuations of the brake pedal.

In accordance with a concomitant feature of the invention, a progressive force/travel spring characteristic is designed such that, during braking with low decelerations, highly sensitive metering of a braking effect becomes possible and, for braking with high decelerations, an additional short pedal travel is required.

Other features which are considered as characteristic for the invention are set forth in the appended claims.

Although the invention is illustrated and described herein as embodied in a brake pedal configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
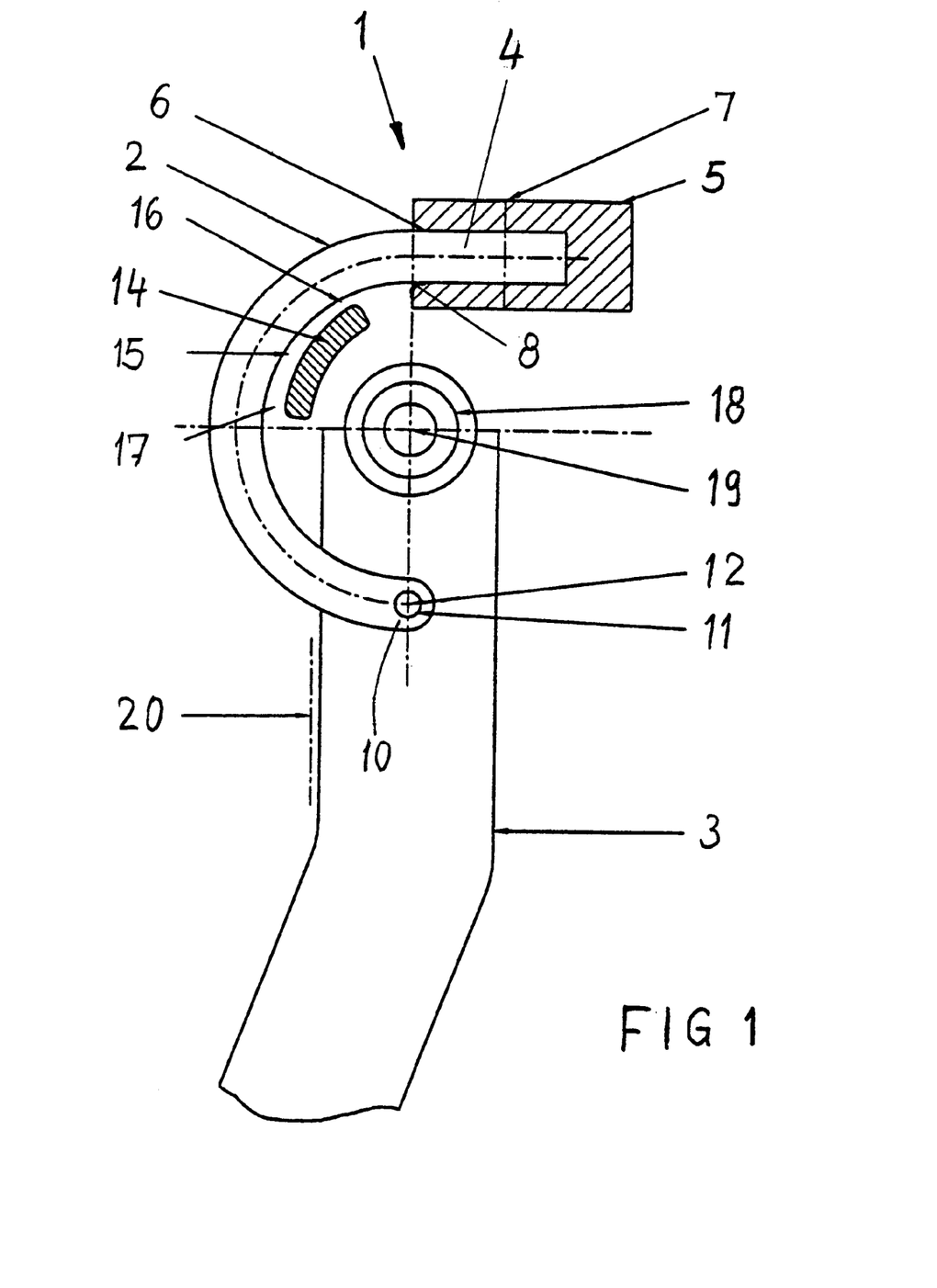
FIG. 1 is a partial side view of a first exemplary embodiment of a brake pedal configuration according to the invention.

Referring now to the figures of the drawing in detail and first, particularly, to FIG. 1 thereof, there is seen a brake pedal configuration 1—also designated a brake power encoder or pedal simulator. A brake pedal 3 is supported on an arcuately or semicircularly curved leaf spring 2. The leaf spring 2 provides a resistance or reaction force against the entire foot force applied to the brake pedal 3 by the driver. The leaf spring 2 is clamped fixedly at its upper end 4 in a support 5, for example to the frame of the automobile or in a pedal bearing block. For this purpose, the end 4 is inserted into a horizontal guide groove 6 and is fastened by means of a diagrammatically indicated fixing element 7, for example a pin. Where the leaf spring 2 emerges from the guide groove 6, the latter has a rounded edge 8 which prevents stress peaks from occurring there in the leaf spring 2.

The leaf spring 2 is connected at its lower end 10 to the brake pedal 3 by means of a pivot or rotary joint 11. The foot force introduced at the brake pedal 3 is supported at the rotary joint. The connection is made by means of a straight pin 12. In order to reduce friction between the straight pin 12 and the leaf spring 2, a sliding bearing bush (for example, a bronze bush) or a rolling bearing (for example, a needle bearing) may be inserted between the two parts. Friction may also be made adjustable.

Due to the fact that the leaf spring 2 has an essentially linear characteristic, a stop 14, by means of which a progressive pedal characteristic is achieved, is provided for the leaf spring. After a predetermined pedal travel has been executed, the leaf spring 2 touches the stop 14, by means of which the free flex of the leaf spring is then restricted. Consequently, when the brake pedal 3 is further actuated, the pedal force increases superproportionally. For the transition of this progressive force increase to be made soft, the distance between the stop 14 and the leaf spring 2 increases in the direction from the upper end of the leaf spring 2 to its lower end. In other words, a wedge-like annular gap is formed between the leaf spring 2 and the stop 14. The wedgelike gap 15 is therefore narrower at its upper end 16 than at its lower end 17. As a result, the leaf spring 2 first comes to bear on the upper end of the stop 14 (in the drawing). As the pedal is further actuated, the annular gap 15 is gradually closed. As soon as the annular gap 15 is completely closed, that is to say the leaf spring 2 bears fully on the stop 14, the maximum pedal travel is reached.

The pedal travel, which corresponds to the rotary angle covered by the brake pedal when the latter is actuated by the driver, is detected by means of a rotary angle sensor 18 attached to a rotary bearing 19 in which the brake pedal is mounted. The pedal force exerted on the brake pedal is detected by means of one or two force sensors 20 which are designed, for example, as strain gauges.

Figure 2:
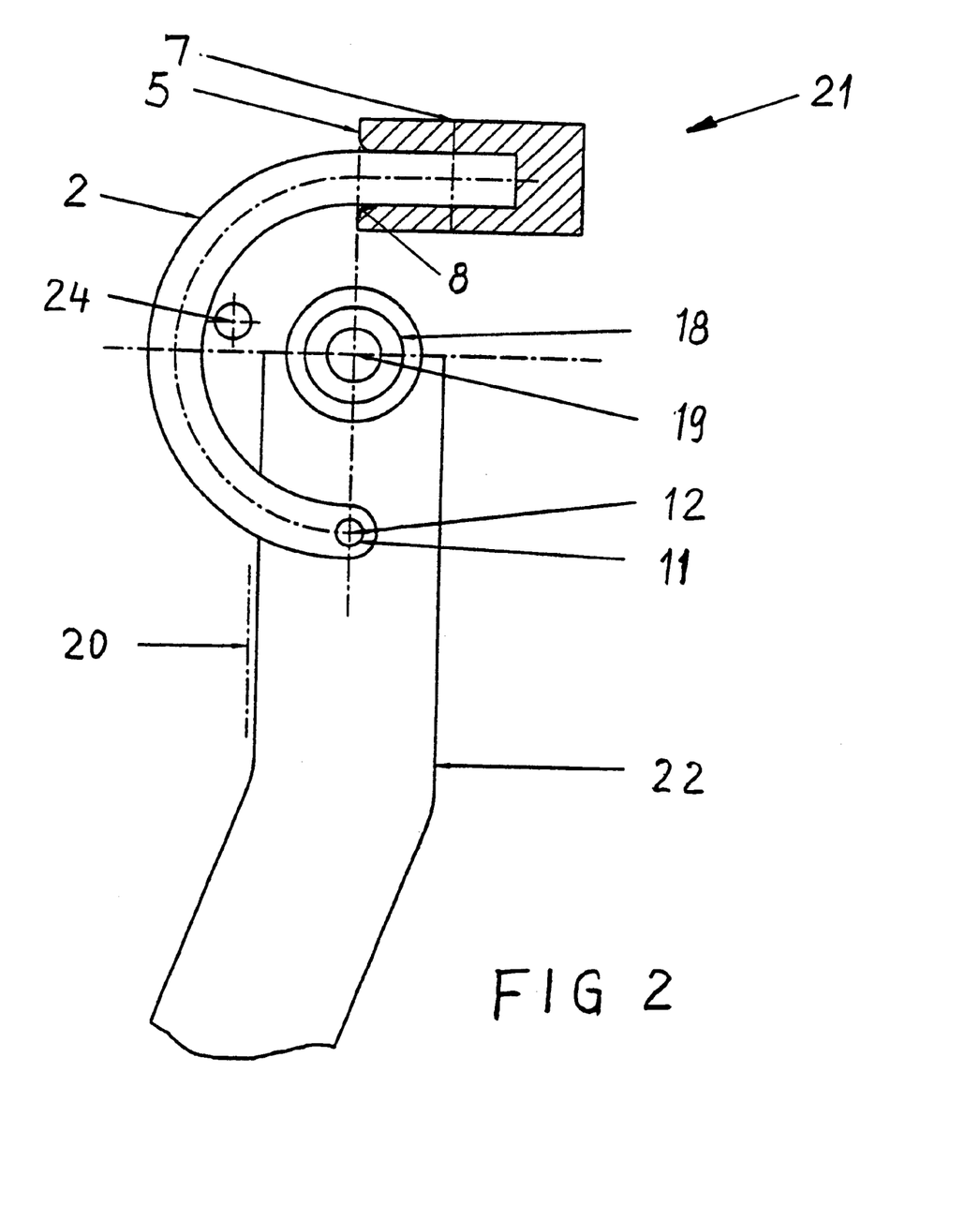
FIG. 2 is a partial side view of a second exemplary embodiment of the brake pedal configuration.

The second embodiment of the brake pedal configuration 21 illustrated in FIG. 2, has a stop 24, which is designed as a simple cylindrical bolt. When the brake pedal is actuated, the actuating force to be applied by means of the foot first increases proportionally to the pedal travel. When the leaf spring 2 reaches the stop 24, the free flexion of the leaf spring is restricted. The pedal force consequently increases superproportionally. If the diameter of the bolt forming the stop 24 is selected so as to be sufficiently large, the spring constant progresses smoothly, since the leaf spring 2 then does not come into contact abruptly with the bolt. Those components that are the same as those of the first embodiment are provided with the same reference numerals as in FIG. 1.

Figure 3:
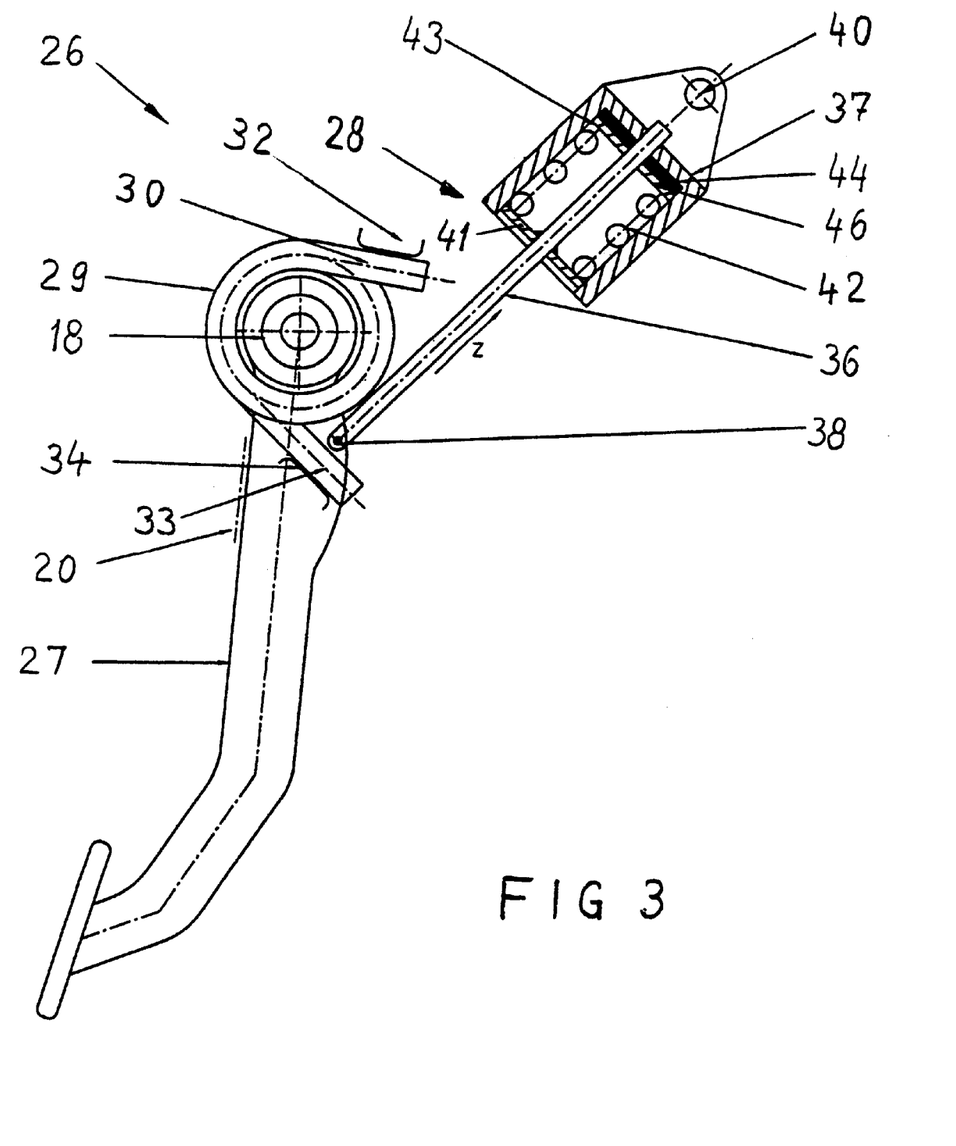
FIG. 3 is a side view of a third exemplary embodiment of the brake pedal configuration.

A third exemplary embodiment of the brake pedal configuration 26 according to the invention is illustrated in FIG. 3. There, the resistance or reaction force on the brake pedal 27 is made progressive by means of an additional resilient supporting configuration 28. The basic force is absorbed, here, by a torsion spring 29 disposed coaxially about the center of rotation or the rotary bearing of the brake pedal 27. An upper leg 30 of the spring 29 is connected fixedly to a support 32 on the automobile, for example to its frame or a pedal bearing block. The support, in its simplest design, is a stop plate. A lower leg 33 of the torsion spring 29 bears on a stop 34 which is provided on the brake pedal 27. The torsion spring 29 itself, by virtue of its principle, has a linear spring characteristic $R_{DF}$.

Figure 6:
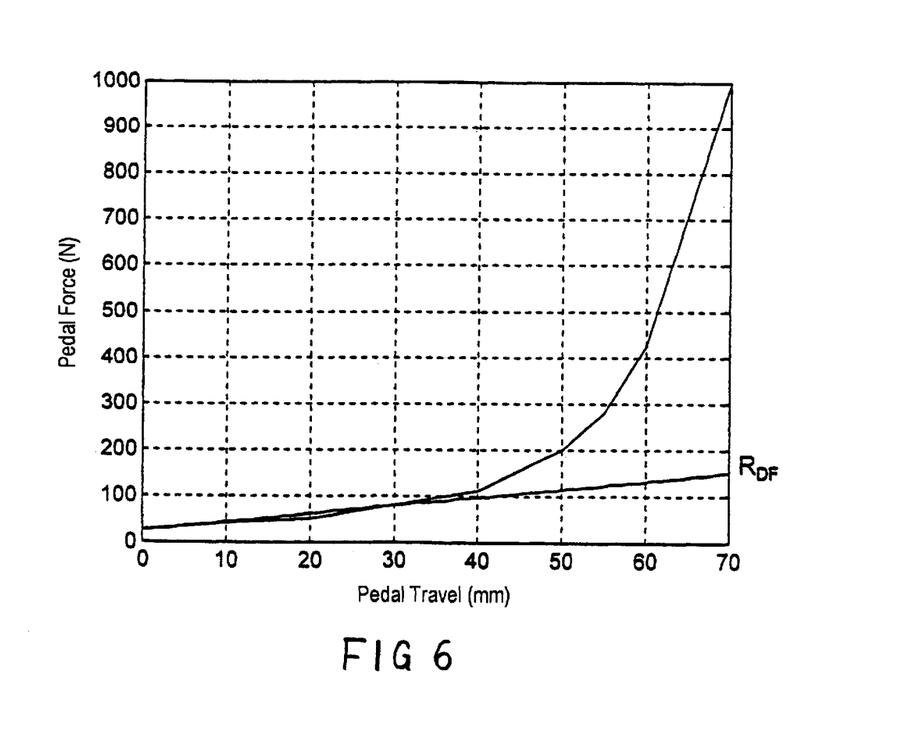
FIG. 6 is a graph illustrating progressive increase in the characteristics of the pedal configuration of FIG. 3 by use of an additional resilient of the torsion spring which has a spring characteristic $R_{DF}$.

With reference to FIG. 6 in connection with FIG. 3, the initial region of the characteristic of the pedal configuration 26 is covered by the spring characteristic $R_{DF}$ of the torsion spring 29. The desired progressive increase in the characteristic of the pedal configuration 26 is achieved by means of the additional resilient supporting configuration 28. The latter includes a supporting rod 36, which engages obliquely on the brake pedal 29, and a spring pot 37 connected to the supporting rod. The additional supporting force is introduced via a rotary joint 38, at which the supporting rod 36 is connected to the brake pedal 29. The supporting rod 36 projects at its upper end into the spring pot 37 which is articulated at a fixed point 40 in the automobile.

Figure 7:
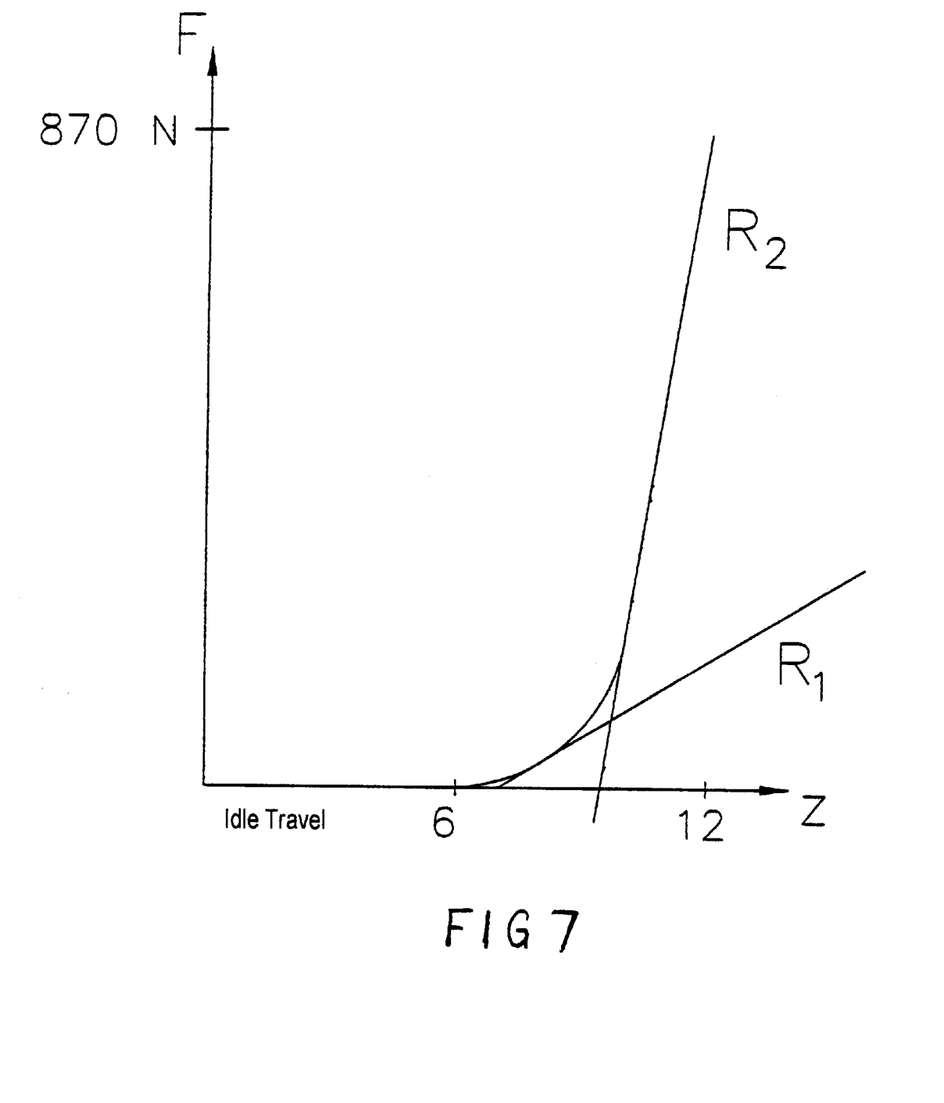
FIG. 7 is a graph illustrating the spring characteristic of the pedal configuration of FIG. 4 illustrating in the form of the pedal force in Newtons plotted against the pedal travel in mm.

A circular disk 41, which bears on a helical (compression) spring 42, is fastened, for example welded, to the supporting rod 36. The spring has axial play 43 in the spring pot 37 and therefore takes effect only after a predetermined idle travel has been executed. After the brake pedal has been actuated so as to exceed the idle travel, the helical spring is compressed by the disk 41, specifically at most until all the turns of the helical spring 42 lie against one another. A further increase in the pedal force is made possible by an elastic stop 44 which may, for example, be a rubber disk 44. The effect of this rubber disk 44 on the overall characteristic of the pedal configuration 26 is illustrated in the diagram of FIG. 7. In order to introduce the compressive force of the helical spring 42 homogeneously into the elastic disk 44, a rigid thrust plate 46 is inserted between the two.

Here too, the rotary angle sensor(s) 18 and force sensor(s) 20 serve for measuring the pedal actuation.

Figure 4:
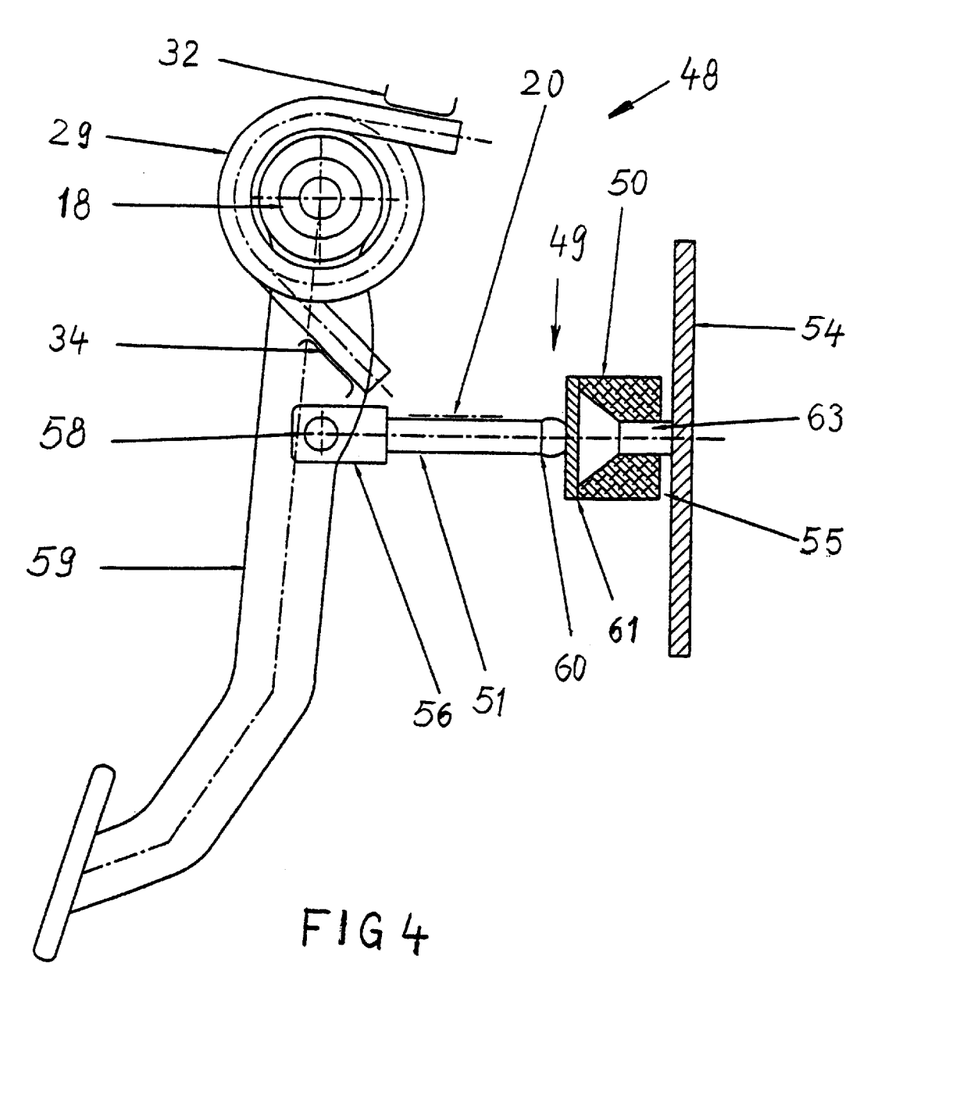
FIG. 4 is a side view of a fourth exemplary embodiment of the brake pedal configuration that is somewhat simpler than the embodiment of FIG. 3.

A fourth exemplary embodiment of the brake pedal configuration 48 according to the invention is illustrated in FIG. 4. The fourth embodiment represents a simplified variant of the pedal configuration 26 according to FIG. 3. A resilient supporting configuration 49 consists, here, of an elastic molding 50, for example of a rubber or caoutchouc buffer, and of a pushrod 51. The overall length of the supporting configuration 49 is so short that it can be mounted horizontally forward in the vehicle, for example on a splashboard 54. The progressive counterforce or reaction force to the pedal actuation force is built up, here, in the elastic molding 50. The initial region of the pedal characteristic is covered, here too, by the torsion spring 29. In this region, support by the rubber buffer is not yet effective, since there is axial play 55 between the latter and the splashboard 54.

At the left end of the pushrod 51 there is provided a fork head 56 which is fastened to the brake pedal 59 by means of a rotary joint 58. The rotary joint 58 can take the form of a simple straight pin. The brake actuation force is transmitted from the pushrod 51 via a spherical head 60 and a thrust plate 61 to the elastic molding 50. The axial force is consequently introduced homogeneously into the latter. The molding 50 has a rotationally symmetric shape, and it has a central passage bore and, on its left side, a conical widening which may be seen from the drawing. It is mounted displaceably on a guide pin 63, which is fastened to the splashboard 54, so as to bridge the axial play. By virtue of the geometry of the elastic molding 50, the resilient supporting configuration 49 has a progressive force/travel characteristic. The further the molding 50 is compressed, the greater the bearing surface of the rubber on the thrust plate 61 becomes. In this case, the necessary force increases superproportionally.

In the above-described embodiments of the pedal configuration according to the invention, the damping of the pedal movement can be adjusted via bearing friction at the respective suspension points.

Figure 5:
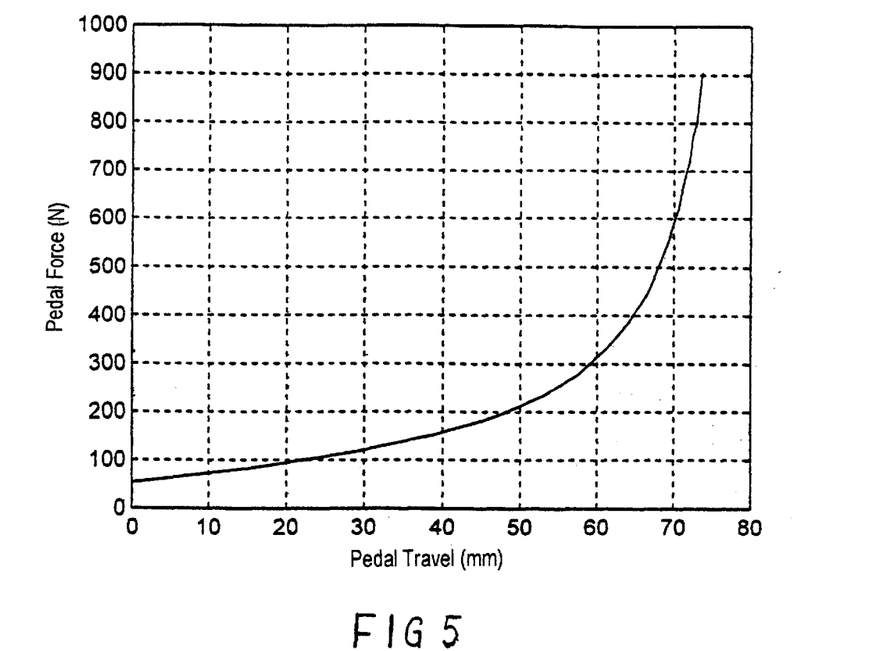
FIG. 5 is a graph illustrating typical characteristics of pedal configurations of FIGS. 1 and 2 in the form of the pedal force in Newtons plotted against the pedal travel in mm.

The diagram of FIG. 5 illustrates typical characteristics of pedal configurations according to the invention, specifically in the form of the pedal force in Newtons plotted against the pedal travel in mm. The steep increase in pedal force with an increasing pedal travel is characteristic. This is a profile that determines a progressive force/travel characteristic. Such a characteristic is highly advantageous for the pedal configuration, since it makes it possible for the brake system to be capable of being operated in a highly expedient way.

As mentioned above, during normal braking the initially relatively soft brake pedal makes it possible to meter the braking effect with very high sensitivity. By contrast, during emergency braking, the brake pedal is depressed quickly and operated with great foot force. In order to keep the reaction time short, the soft zone with low pedal force is traversed rapidly and, thereafter, the pedal force rises sharply over a very short pedal travel. The pedal configuration is expediently coordinated in such a way that the maximum pedal force that is to be applied by a normal driver occurs when the pedal travel is the most ergonomically favorable. Since there is no mechanical connection to the actual brake system, the pedal sensation can be set freely, irrespective of the brake system and the vehicle type.

The diagram in FIG. 6 graphs a characteristic of a pedal configuration provided with a torsion spring. The first region of the characteristic is determined by the torsion spring characteristic (spring rate of the torsion spring) $R_{DF}$.

The diagram in FIG. 7 graphs the spring characteristic of the pedal configuration 48 of FIG. 4. Here too, the pedal or spring force F (N) is plotted against the pedal or spring travel Z (mm). The first 6 mm constitute the idle travel which corresponds to the axial play 43. The region $R_1$ corresponds to the spring characteristic of the helical spring 42, which has a numerical value of about 150 N/mm, and the region $R_2$ corresponds to the spring characteristic of the rubber disk, with a numerical value of about 2500 N/mm.

By means of the pedal configuration according to the invention, the space in the automobile, which is required in the case of conventional brake systems for the brake booster and the brake master cylinder, becomes free. Moreover, the pedal configuration may be designed as a complete mounting unit. For this purpose, the brake pedal and all the other components of the pedal configuration are fastened to a bearing block. The entire configuration can then be installed as a whole in the automobile, without further connections for the brake system having to be fitted. Another advantage is the markedly improved crash behavior of the pedal configuration. The long and the bulky components of conventional brake systems, such as the brake master cylinder, the brake booster and the pushrod between the brake pedal and the brake booster, represent a high risk potential in the event of frontal collisions, since, in this case, the brake pedal often penetrates into the passenger space. This risk can be countered only at considerable outlay in conventional brake systems. Such a risk is avoided entirely by means of the pedal configuration according to the invention.

The use of three sensors, for example two force sensors and one travel sensor or else two travel sensors and one force sensor, ensures that the brake power encoder has a high degree of operating reliability. If one of these sensors fails, the defective sensor can be identified without any doubt by means of the remaining two sensors. Since, apart from the sensors, only mechanical components are used and, moreover, apart from the very small amount of electrical energy for supplying the sensors, no other auxiliary energy is required for operating the pedal configuration, the latter has a high degree of fail safety.

I claim:

1. A brake pedal configuration, comprising:

a brake pedal mounted about a pivot axis to be pivoted between a position of repose and an actuated position;

a spring configuration disposed so as to provide a resistance force opposing a brake actuation force exerted on the brake pedal;

said spring configuration having a nonlinear spring characteristic and including a spring with an upper end fastened at a support and a lower end pivotally mounted at said brake pedal and coaxial about said pivot axis of said brake pedal, and a middle region, said spring is curved in the position of repose of said brake pedal; and a stop disposed opposite said middle region of said spring such that said spring comes to bear against said stop after a partial deflection thereof.

2. The brake pedal configuration according to claim 1, wherein said spring is circular shaped in the position of repose of said brake pedal.

3. The brake pedal configuration according to claim 1, wherein said spring is a leaf spring.

4. The brake pedal configuration according to claim 1, wherein said stop and said spring define a wedge-shaped annular gap therebetween, said gap widening in a direction from said upper end toward said lower end of said curved spring.

5. The brake pedal configuration according to claim 1, wherein said stop is a bolt having a round cross section.

6. The brake pedal configuration according to claim 1, wherein said nonlinear spring characteristic is a progressive spring characteristic is designed such that while braking for obtaining a low deceleration, highly sensitive metering of said low deceleration is possible, yet, for braking requiring a high deceleration, only a short pedal travel is required.

7. The brake pedal configuration according to claim 1, wherein said brake pedal is used with electrically actuated wheel brakes.

8. The brake pedal configuration according to claim 1, which further comprises a plurality of sensors sensing actuations of said brake pedal.

\* \* \* \* \*